United States Patent [19]

Kakizaki et al.

[11] Patent Number: 5,317,462
[45] Date of Patent: May 31, 1994

[54] COVER SEAL FOR MAGNETIC DISK ENCLOSURE HAVING STEPPED MATING SURFACES

[75] Inventors: Yoshitaka Kakizaki, Fuchu; Hiroki Kitahori, Chigasaki; Kazuhiko Takada, Yamato, all of Japan

[73] Assignee: International Business Machines Corporation, Armonk, N.Y.

[21] Appl. No.: 962,361

[22] Filed: Oct. 16, 1992

[30] Foreign Application Priority Data

Oct. 18, 1991 [JP] Japan ................................. 3-297602

[51] Int. Cl.⁵ ............................................ G11B 17/02
[52] U.S. Cl. .............................. 360/97.02; 174/52.3; 220/358
[58] Field of Search ............... 360/97.01, 97.02, 97.03, 360/97.04; 174/52.3; 220/344, 357, 358, 377

[56] References Cited

U.S. PATENT DOCUMENTS 4,418,369 11/1983 Applequist et al. .............. 360/97.03
5,157,577 10/1992 Balaud et al. ...................... 361/390
5,233,491 8/1993 Kadonaga et al. .............. 360/97.02

FOREIGN PATENT DOCUMENTS 62-279586 12/1987 Japan .

Primary Examiner—Robert S. Tupper
Attorney, Agent, or Firm—Richard E. Billion; Roy W. Truelson

[57] ABSTRACT

To provide a magnetic disk apparatus in which an outline of a seal for hermetically sealing is identical with that of a cover and base having steps at the periphery thereof. In a sealed magnetic disk apparatus in which a cover and base having steps at the periphery thereof are joined together via a seal, two slopes 48 and 50 are provided, in a turned or stairs-like form, at each step portion at the periphery of a cover 60 and a base 40. The first slope 48 descends from the periphery toward the inside, and the second slope 50 connecting to the first slope descends from the inside toward the periphery. The slopes of the cover are provided to mate with those of the base, respectively. A seal 70 has an outline which is substantially identical with that of the cover 60 and the base 40 and includes projections 72 and 74 covering the slopes.

10 Claims, 5 Drawing Sheets

COVER SEAL FOR MAGNETIC DISK ENCLOSURE HAVING STEPPED MATING SURFACES

BACKGROUND OF THE INVENTION

1. Field of the Invention

This invention relates to a sealed magnetic disk apparatus and, more particularly, to a magnetic disk apparatus in which a cover and base having steps at the periphery thereof are joined together via a seal.

2. Description of the Prior Art

A small magnetic disk apparatus used in many personal computers and workstations is very sensitive to gas and dust in the air. When they get in the apparatus, gas causes the apparatus (especially a disk) to be rusted, and dust causes the magnetic disk apparatus to be damaged because it gets in between the disk and a head floating on the disk. The small magnetic disk apparatus is therefore assembled in a clean room where gas and dust are very little.

In a conventional magnetic disk apparatus, the intrusion of gas and dust is prevented by sealing with a seal material. FIG. 1 is a simple example of a way of sealing for a small magnetic disk apparatus. In the magnetic disk apparatus, the intrusion of gas and dust is prevented by holding a seal 14 between the contact surfaces of a base 10 and a cover 12. Besides, in order to ensure the sealing, the four corners of the cover 12 and the base 10 are screwed down by bolts 16. So as to seal the periphery of the base 10 and the cover 12, the seal 14 is formed according to the outline of the periphery, for example, in a width of about 2 millimeters. The four corners of the seal 14 are curved inside so as to seal the insides of slightly swollen screw nut portions which are at the four corners of the base 10 and the cover 12. In the base 10, a hole 18 through which a shaft of a motor for rotating a disk is passed, is made. FIG. 2 shows an enclosure after sealing. Japanese Published Unexamined Patent Application (PUPA) 62-279586 discloses a magnetic disk drive apparatus which is provided with not only a first seal material corresponding to the seal 14, but also a second seal material between a cover and a bolt for fixing the cover to a base. As seen, a seal is one of important parts in a small magnetic disk apparatus.

SUMMARY OF THE INVENTION

An object of the present invention is to provide a sealed magnetic disk apparatus in which an outline of a seal is identical with that of a cover and a base.

Another object of the present invention is to provide a sealed magnetic disk apparatus which is able to flexibly cope with high steps.

Still another object of the present invention is to provide a sealed magnetic disk apparatus with high productivity.

The present invention relates to a sealed magnetic disk apparatus in which a cover and base having steps at the periphery thereof are joined together through a seal, characterized in that: two slopes are provided in a turned or stairs-like form at each step portion at the periphery of the cover and the base to which various parts are attached. A first slope descends from the periphery toward the inside, and a second slope connects to the first slope and descends from the inside toward the periphery. In case of the base, higher and lower plates of the step are connected by these slopes. The slopes of the cover are provided to mate with those of the base, respectively. The seal has an outline which is substantially identical with that of the magnetic disk apparatus, that is, the cover and the base which constitute its enclosure, and includes projections covering the slopes.

ADVANTAGES OF THE INVENTION

1. Since an outline of a seal is identical with that of a magnetic disk apparatus, the number of seals cut out from a base sheet increases as compared with the prior art in which the outline of the seal is larger (longer) than that of the magnetic disk apparatus, which improves a yield of a seal production. Besides, the cover and the seal can be easily bonded together by merely pressing down the cover against an adhesive surface of the seal, which improves productivity.

2. Since a sealing portion comprises two slopes in a turned form, a substantial length of the slopes projected on a horizontal plane is half of the length in the prior art. Thus, even if the step is high, the present invention can cope with such a high step without narrowing a space for accommodating parts.

3. An outline of a seal does not change regardless of the position and number of steps, and such situations can be coped with by merely providing projections at the positions corresponding to the steps.

DETAILED DESCRIPTION OF THE PREFERRED EMBODIMENTS

Figure 1:
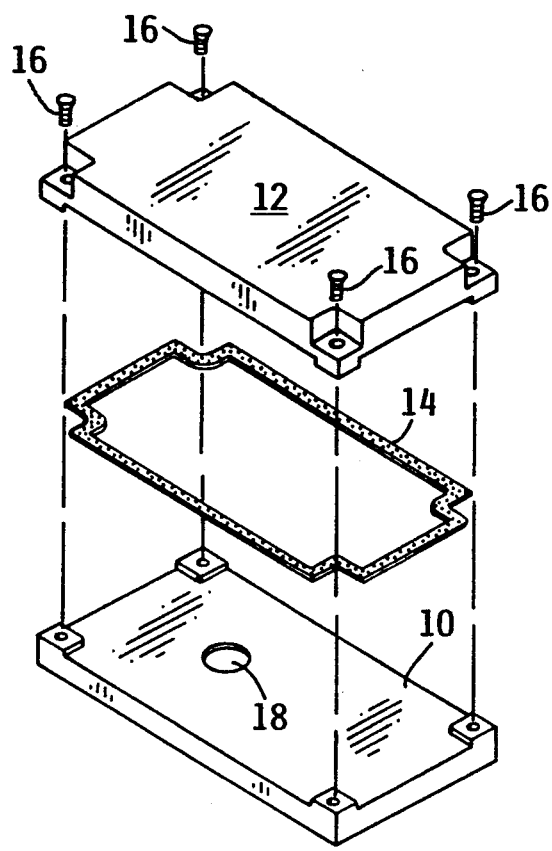
FIG. 1 is a perspective view showing a manner for assembling a conventional magnetic disk apparatus.
Figure 2:
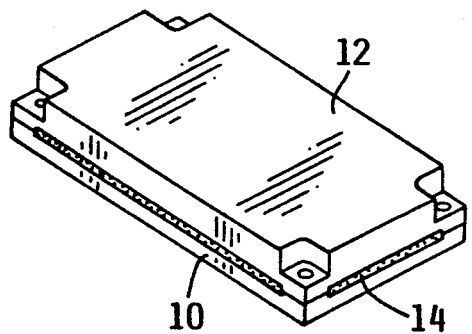
FIG. 2 is a perspective view showing the magnetic disk apparatus after assembling according to FIG. 1.
Figure 3:
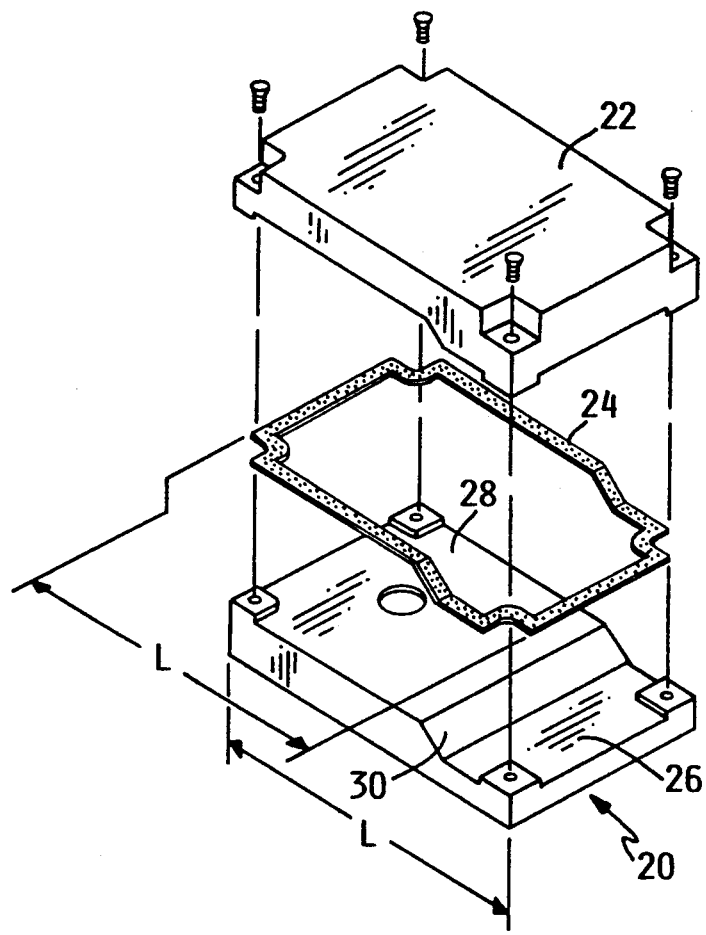
FIG. 3 is a perspective view showing a manner for assembling a conventional magnetic disk apparatus in which a base has step.
Figure 4:
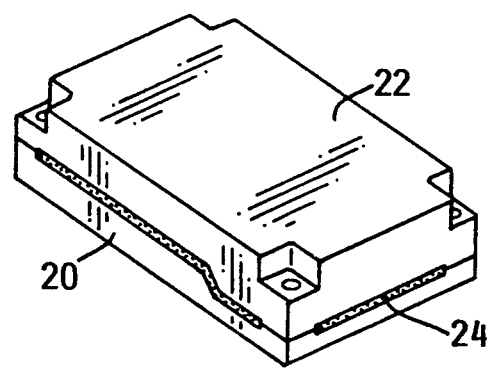
FIG. 4 is a perspective view showing the magnetic disk apparatus after assembling according to FIG. 3.

FIG. 1 is an example of a magnetic disk apparatus in which the base 10 and the cover 12 are flat, but in fact, such a combination of flat parts seldom occurs by reason of, for example, the height of parts in a magnetic disk apparatus and the height of IC's on a substrate. FIG. 3 and FIG. 4 show how a base 20 and cover 22 having a step are sealed by a seal 24. In FIG. 3, a lower portion 26 of the base 20 is for loading high machine parts such as an actuator and a VCM, and electrical parts are accommodated beneath a higher portion 28. In this example, the cover 22 should be also provided with a step because the step of the base 20 extends to the periphery (if a lower portion of the base 20 exists only inside the base 20, there is no need to provide the cover 22 with a step and its appearance is the same as in FIG. 2). Therefore, as compared with the case using flat parts in FIG. 1 and FIG. 2, the following problems occur:

In FIG. 3, the seal 24 is shown in the form which is bent at the step, and accordingly its longitudinal length L is equal to that of the base 20 and the cover 22. However, the actual length of the seal 24 is slightly longer than L because the seal 24 is made in a straight form at first. Since a seal is generally produced by cutting out from a base seal sheet according to a pattern of its outline, the number of seals cut out from a base seal sheet is decreased if the outline becomes larger, which lowers "yield".

If a step is high, it is necessary to take enough length of a slope 30 and slant it down smoothly. The reason is because the sealing performance is remarkably decreased if a slope is short and slants down sharply. But, if enough length is taken for a slope, a space for parts in a magnetic disk apparatus and IC's on a substrate becomes narrow.

When a sealed magnetic disk apparatus is manufactured, generally, a seal is previously attached to a cover and a base is fixed to the cover by screws or the like. When the seal is first attached to the cover, the work of attaching becomes difficult unless an outline of the cover is identical with that of the seal, which decreases productivity.

Figure 5:
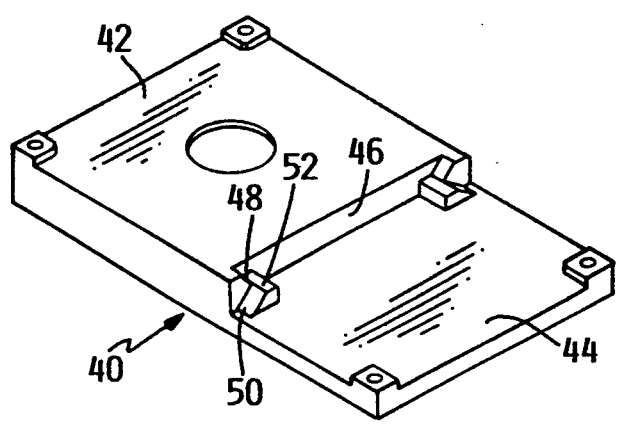
FIG. 5 is a perspective view showing an embodiment of a base of a magnetic disk apparatus according to the present invention.
Figure 6:
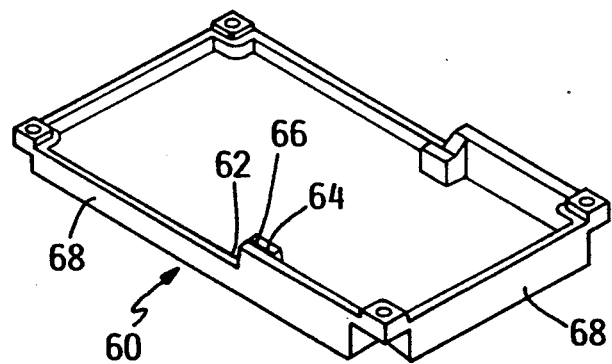
FIG. 6 is a perspective view showing a cover, turned upside down, which is to be attached to the base of FIG. 5.

FIG. 5 and FIG. 6 show examples of a base and a cover of a magnetic disk apparatus according to the present invention, respectively. In FIG. 5, the step of a base 40 extends to the periphery of the base 40 in the same way as in FIG. 3, and a first plate 42 and a second plate 44 are connected through a step portion 46. Both ends of the step portion, that is, places having steps at the periphery of the base 40 are provided with special sealing portions which connect the first plate 42 with the second plate 44 according to the present invention, so as to hermetically seal the ends of the step portion. As shown, each sealing portion includes two slopes 48 and 50 which extend in the direction crossing (preferably at right angles) the longitudinal direction of the base 40. A first slope 48 descends from the periphery toward the inside of the base 40. A second slope 50, which connects to the first slope 48 through a portion 52 which corresponds to a landing of stairs, descends from the inside toward the periphery of the base 40. It is desirable that the width of the first slope 48, the second slope 50, and the landing portion 52 should be the same as that of the seal. Besides, each of the top end of the first slope 48 and the bottom end of the second slope 50 is located inside from the periphery by the width of the seal. In fact, the seal is cut out from a base seal sheet according to the width of these portions.

As described above, each sealing portion is characterized by descending from the first plate 42 toward the second plate 44 in a turned or stairs-like form, in the direction crossing the longitudinal direction of the base 40. In the prior art, a base plate slants down along the longitudinal direction of a base, and therefore the outline dimension of a seal becomes longer thereby (see FIG. 3). According to the present invention, it is possible that the wall of the step portion 46 makes right angles with the first plate 42 and the second plate 44, so that a space for accommodating parts is increased as compared with the conventional magnetic disk apparatus having a slanted wall.

It is preferred that the angle of the slopes 48 and 50 to a horizontal plane be 30 to 45 degrees, though it depends on the length of the slopes. When the height of the step is large, the angle may be made as large as possible within this range so as to obtain a shorter slope length to prevent the space for accommodating the parts from being narrowed. It is not preferred that the angle exceeds 45 degrees because sealing performance goes down.

Figure 7:
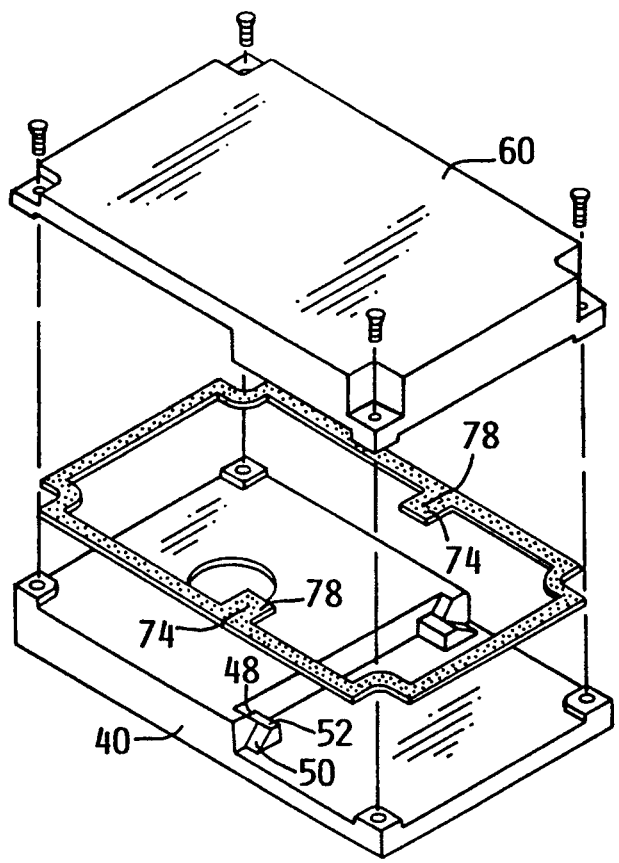
FIG. 7 is a perspective view showing a manner for assembling a magnetic disk apparatus according to the present invention using the base of FIG. 5 and the cover of FIG. 6.

FIG. 6 shows a cover, turned upside down, which is put on the base of FIG. 5. As shown, a cover 60 has steps corresponding to the step of the base 40 at the periphery (actually at a side wall which demarcates the periphery), and a sealing portion including two slopes 62 and 64 mating with the slopes 48 and 50 of the base 40, respectively, is provided at a position corresponding to each sealing portion of the base 40. A thickness or width of the side wall 68 which demarcates the periphery of the cover 60 is preferably identical to the width of the slopes 62 and 64. These widths are selected (for example, 1.5 to 2 millimeters) so as not to lower the sealing performance. If they are too thick, a space for accommodating the parts is decreased. A top surface of the side wall 68 is to be attached to the base 40. When the cover 60 of FIG. 6 is turned upside down and put on the base 40 of FIG. 5, the slope 62 lies upon the slope 48 of the base 40 and the slope 64 lies upon the slope 50 of the base 40. This is also true of other slopes without reference numbers. The seal for sealing the contact surface of the base 40 and the cover 60 is integrally formed so as to include projections covering these slopes, with a width of, for example, 1.5 to 2 millimeters. FIG. 7 shows a manner for joining the base 40 and the cover 60 using such a seal.

In FIG. 7, a seal 70 includes inward projections 72 and 74 at the positions corresponding to the respective sealing portions of the base 40 and the cover 60 so as to cover the corresponding sealing portions. The outline of the seal 70 is substantially identical with that of the seal 14 in FIG. 1 except for the projections, and the four corners of the seal 70 are curved inward according to the shape of the screw clamp portion. There are slits 76 and 78 in the middle of the projections 72 and 74 according to a border between two slopes of the corresponding sealing portion. Taking the projection 72 as an example, the left part of the slit 76 covers the slope 48 of the base 40 and the slope 62 of the cover 60, and the right part of the slit 76 covers the slope 50 of the base 40 and the slope 64 of the cover 60. The top end of the projection 72 covers the landing portion 52 of the base 40 and the landing portion 66 of the cover 60. The above description for the projection 72 is applied also to the projection 74. Therefore, when the seal 70 is cut out from a base sheet, projections need to be cut out according to the shape of sealing portions of a base and a cover. As shown in the figure, the longitudinal dimension of the seal 70 is identical to that of the base and the cover, and accordingly the outline of the entire seal can be substantially identical with that of the magnetic disk apparatus.

Figure 8:
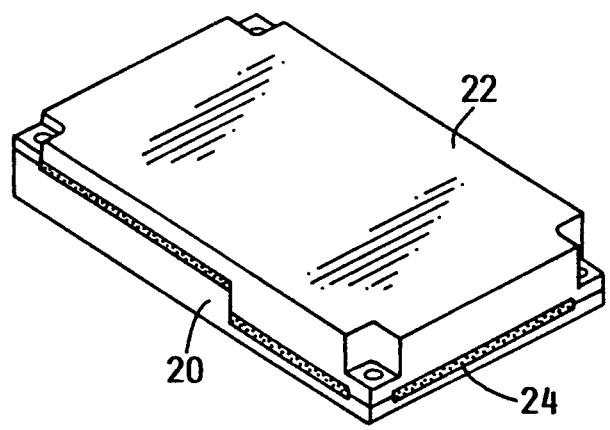
FIG. 8 is a perspective view showing the magnetic disk apparatus after assembling according to FIG. 7.

When the magnetic disk apparatus shown in FIG. 7 is manufactured, the base 40 and the cover 60 are first formed, for example, by aluminum die casting, as shown in FIG. 5 and FIG. 6, respectively, and the seal 70 made of a polymer, is cut out from a large base sheet according to the shape of the top surface of the side wall 68 including the sealing portions of the cover 60. Seal materials may be suitably selected, and a foamed plastic whose one side is adhesive is used in the embodiment. Next, the cover 60 is pressed down against the adhesive surface of the seal 70 to bond them together. Because the outline of the cover 60 is identical with that of the seal 70, it is possible to bond together by merely pressing. In the prior art, it was necessary to form a seal according to a cover upon bonding together because their outlines were different (see FIG. 3). Finally, the cover 60 with the seal 70 bonded is fixed to the base 40 by screws. In fact, various parts are mounted on the base 40, but how to mount the parts is not described here because it is not the gist of the present invention. FIG. 8 shows a magnetic disk apparatus which is manufactured in such a way.

Figure 9:
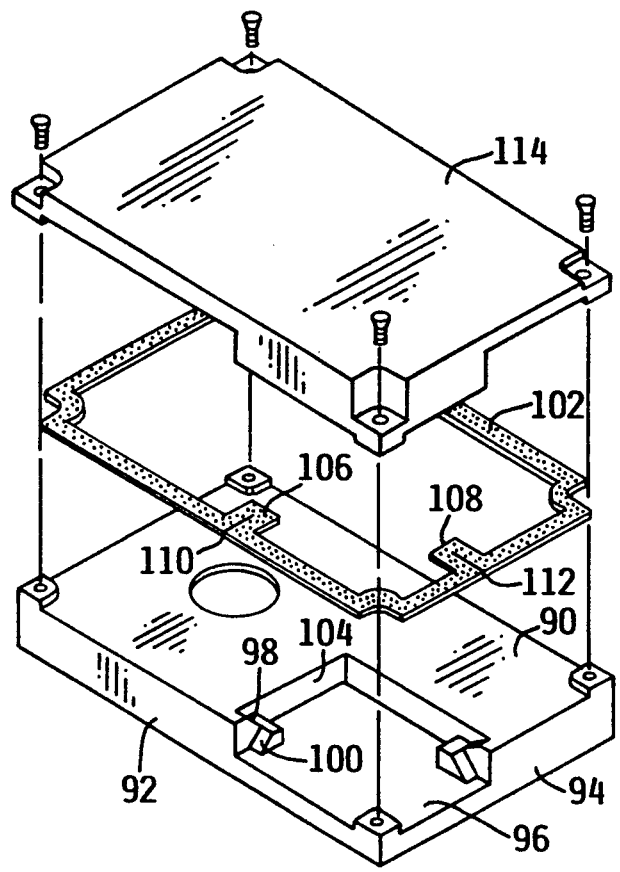
FIG. 9 is a perspective view showing an assembling of another embodiment of the magnetic disk apparatus according to the present invention.
Figure 10:
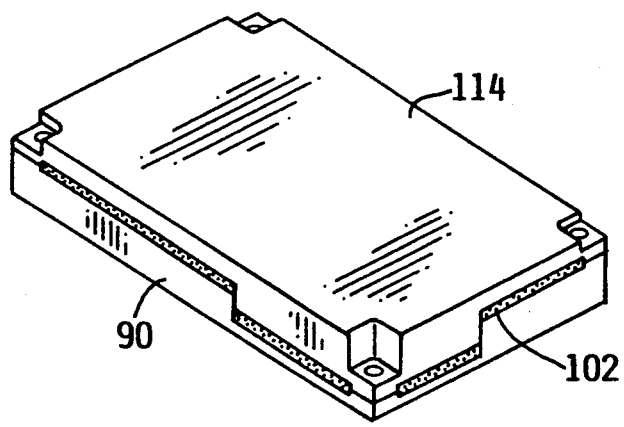
FIG. 10 is a perspective view showing the magnetic disk apparatus after assembling according to FIG. 9.

In the examples of FIG. 5 to FIG. 8, both steps, and hence, sealing portions are on a first longer side of the rectangular magnetic disk apparatus and on a second longer side parallel to the first longer side, respectively, but one of them may be provided on a shorter side. FIG. 9 and FIG. 10 show such an example. In FIG. 9, a base 90 has steps on a longer side 92 and a shorter side 94 intersecting it, respectively, and a lower plate 96 faces these sides. The shape of the sealing portions is the same as in FIG. 5. That is, each of the sealing portions provided at step portions on the longer and shorter sides 92 and 94 of the base 90, includes a first slope 98 descending from the periphery toward the inside and a second slope 100 connecting the first slope and descending from the inside of the base toward the periphery, and each of the top end of the first slope 98 and the bottom end of the second slope 100 is located inside from the periphery by the width of a seal 102. Preferably, the direction of these slopes makes a right angle with the associated sides. In the example of FIG. 9, a wall 104 of the step curves at a right angle inside the base 90, but as far as the present invention is concerned, a position of a wall inside the base is of no importance and may be arbitrarily determined as required. For example, the wall 104 may be straight between the two sealing portions or may arch. However, taking a space for accommodating parts into consideration, it is preferably that the wall 104 makes a right angle with a surface of the base 90.

In the same way as the embodiment of FIG. 7, the seal 102 includes inward projections 106 and 108 at the positions corresponding to the sealing portions of the base 90, respectively. In the middle of each projection, a slit 110 or 112 is provided at the position corresponding to a boundary between two slopes, for example, the slopes 98 and 100, so as to cover each slope successfully. As a matter of course, similar sealing portions are also provided at step portions on a side wall of a cover 114, though they are not shown in FIG. 9. FIG. 10 shows a sealed magnetic disk apparatus in which the base 90 and the cover 114 are joined together through the seal 102.

The preferred embodiments of the present invention have been described above, but various modifications are possible in addition to these embodiments. It will be appreciated that, for example, depending on the position of a wall of a step inside a base, each sealing portion may be provided on the same longer or shorter side. It will be appreciated also that a base may have two or more lower plates, that is, four or more sealing portions.

What is claimed is:

1. An enclosure comprising:

a base having a periphery and a first peripheral mating surface extending around the periphery of the base, said first peripheral mating surface including
  (a) a first level portion lying in a first level;
  (b) a second level portion lying in a second level, said second level being substantially lower than said first level, said second level portion meeting said first level portion at the periphery of the base to form a step;
  (c) a step sealing portion at the juncture of said first level portion and said second level portion, said step sealing portion including
    (i) a landing portion lying in a level intermediate said first level and said second level;
    (ii) a first slope portion descending away from the periphery of the base from the first level portion of the first peripheral mating surface to the landing; and
    (iii) a second slope portion descending toward the periphery of the base from the landing portion to the second level portion of the first peripheral mating surface;
a cover which mates with the base and includes a second peripheral mating surface opposing said first peripheral mating surface of the base, said second peripheral mating surface including a step sealing portion which mates with the step sealing portion of the first peripheral mating surface; and
a seal lying between the first and second peripheral mating surfaces and covering the entire periphery of said base and said step sealing portion.

2. The enclosure of claim 1 wherein the first slope descends from the periphery of the base at the first level to the landing and the second slope descends from the landing to the periphery of the base at the second level.

3. The enclosure of claim 2 wherein the first slope and the second slope is substantially perpendicular to the periphery of the base.

4. The enclosure of claim 3 wherein said sealing includes a portion which covers the step sealing portion, said portion of the seal comprising a projection with a slit therein.

5. The enclosure of claim 3 wherein said seal includes a portion which covers the step sealing portion, said portion of the seal comprising a u-shaped projection with a slit therein, wherein the slitted portions cover the first and second slopes and the portion connecting the slitted portions covers the landing.

6. A sealed information storage apparatus comprising:

a base having first and second levels in the interior of said sealed information storage apparatus for mounting components in the interior of said apparatus, said first level being higher than said second level, said levels extending to the periphery of the base and forming steps along the periphery of the base, said base further including a first peripheral mating surface extending around the periphery of said base and having first and second portions corresponding to said first and second levels, respectively, said first peripheral mating surface further including step sealing portions near the steps in the base, said step sealing portions including:
  (a) a first sloped portion descending away from the periphery of the base from the first portion of the first peripheral mating surface; and
  (b) a second sloped portion connected to the first sloped portion and descending toward the periphery of the base to the second portion of the first peripheral mating surface;

a mating cover having a second peripheral mating surface opposing said first peripheral mating surface of the base, said second peripheral mating surface including steps which mate with the steps formed along the periphery of the base and step sealing portions which mate with the step sealing portions of the first peripheral mating surface; and a seal positioned between the first and second peripheral mating surfaces.

7. The sealed information storage apparatus of claim 6 wherein the seal has an outline which is substantially identical to the outline of the information storage apparatus, said seal further including a projection which covers the first and second sloped portions.

8. The sealed information storage apparatus of claim 7 wherein the first sloped portion and the second sloped portions are located inside the periphery of the base plate.

9. The sealed information storage apparatus of claim 7 wherein the first sloped portion and the second sloped portion are substantially perpendicular to the periphery of the base plate.

10. The sealed information storage apparatus of claim 7 further comprising:

a spindle attached to said base;

at least one disk attached to said spindle;

an actuator attached to said base; and a transducer attached to the actuator, said transducer moved over the surface of the disk be said actuator.

* * * * *